United States Patent [19]

Hawkins

[11] Patent Number: 4,916,290
[45] Date of Patent: Apr. 10, 1990

[54] PORTABLE OVEN AND AN IMPROVED METHOD FOR HEATING FOOD

[76] Inventor: Junior F. Hawkins, 3120 W. 16th, Wichita, Kans. 67203-1742

[21] Appl. No.: 263,399

[22] Filed: Oct. 27, 1988

Related U.S. Application Data

[63] Continuation-in-part of Ser. No. 78,203, Jul. 27, 1987.

[51] Int. Cl.⁴ .............................................. H05B 3/36
[52] U.S. Cl. .................................... 219/385; 219/387; 219/521
[58] Field of Search ................. 219/521, 385, 386, 387

[56] References Cited

U.S. PATENT DOCUMENTS

| | | | |
|---|---|---|---|
| 3,375,047 | 3/1968 | Townsend | 219/385 |
| 3,721,803 | 3/1973 | DiStefano | 219/521 |
| 4,578,814 | 3/1956 | Skamser | 219/386 |
| 4,806,736 | 2/1989 | Schirico | 219/386 |
| 4,816,646 | 3/1989 | Solomon | 219/387 |

FOREIGN PATENT DOCUMENTS 2521408  8/1983  France ................................ 219/385

OTHER PUBLICATIONS

The Condensed Chemical Dictionary, published 1981, p. 1086.
Material Safety Data Sheet, published 1985 by DuPont Corp.
Mylar ® Safe Handling, published before 1988 by DuPont Corp.
Mylar ® Polyester Film, published before 1988 by DuPont Corp.

Primary Examiner—Teresa J. Walberg
Attorney, Agent, or Firm—John W. Carpenter

[57] ABSTRACT

A pliable and flexible oven that has a pair of flexible walls and a heating element disposed between the flexible walls such that when food is placed between and against one of the flexible walls, it is heated. A method for heating food and the like.

15 Claims, 8 Drawing Sheets

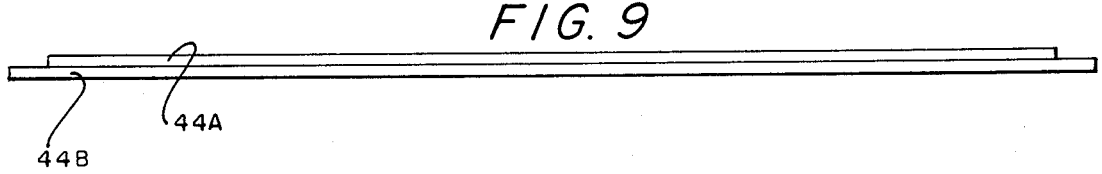
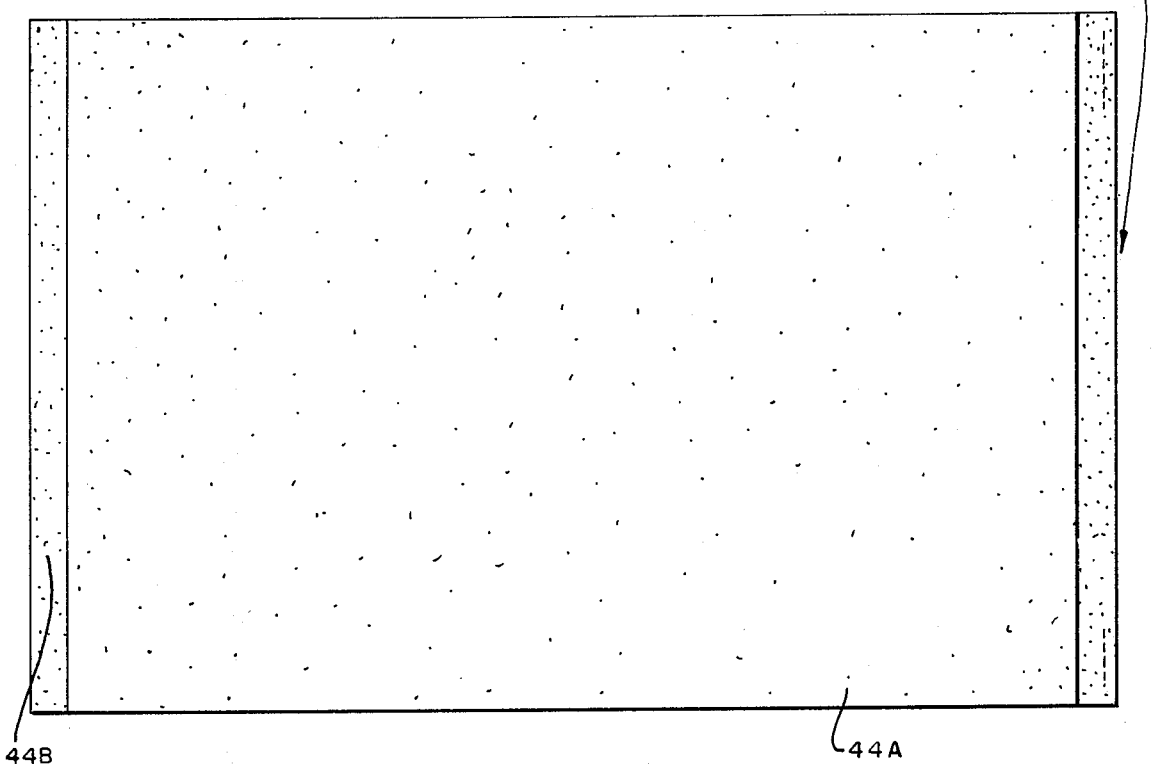
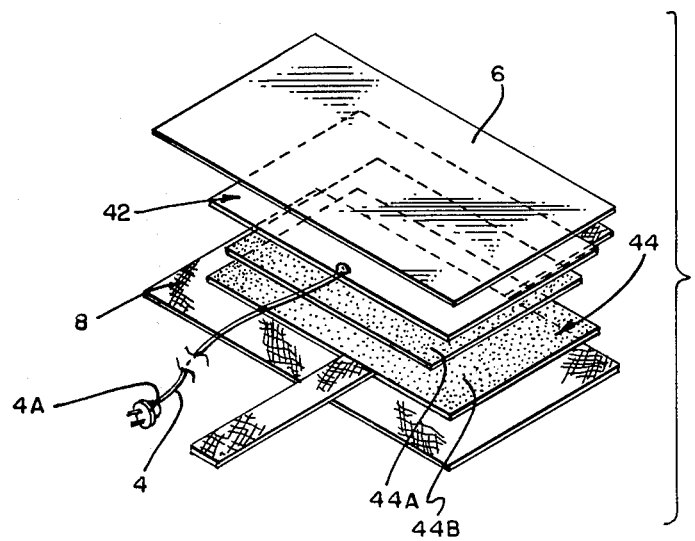

PORTABLE OVEN AND AN IMPROVED METHOD FOR HEATING FOOD is a continuation-in-part application of copending application having Serial No. 078,203, filed July 27, 1987.

BACKGROUND OF THE INVENTION

1. Field of the Invention

This invention is related to a portable oven. More specifically, this invention provides for a pliable and flexible oven which is ideally suited for heating food and the like.

2. Description of the Prior Art

A patentability examination was conducted and the following U.S. patents were discovered: U.S. Pat. No. 2,617,012 to Westley; U.S. Pat. No. 3,375,047 to Townsend; U.S. Pat. No. 3,521,030 to Maahs; U.S. Pat. No. 3,721,803 to DiStefano; U.S. Pat. No. 4,134,004 to Anderson et al.; U.S. Pat. No. 4,140,893 to Renteria; and U.S. Pat. No. 4,303,074 to Bender. The patentability examination also discovered French Patent No. FR 2521-408-A.

SUMMARY OF THE INVENTION invention accomplishes its desired objects by broadly providing a pliable and flexible oven for heating food and the like. The pliable and flexible oven of this invention comprises a pliable and flexible inside wall wherethrough heat can be conducted, and a pliable and flexible outside wall secured to the inside wall. The inside and outside walls are secured to each other such as to form an opening communicating with the inside wall. A fastening means is secured to the periphery of the opening such as to completely seal the opening to totally enclose any food that has been disposed through the opening and resting on the inside wall. A pliable and flexible heating element means is disposed between the inside and outside wall and extends through the outside wall to communicate with a power source. The outside wall is preferably impermeable to heat such that the pliable and flexible oven can be held without burning or any other discomfort to the user.

This invention further accomplishes its desired objects by broadly providing a method for heating food and the like comprising the steps of:

(a) disposing food through an opening within a pliable and flexible inside wall that is surrounded by a heating element extending through a pliable and flexible outside wall that is secured to the inside wall to totally enclose and sandwich the heating element between the inside wall and the outside wall;

(b) sealing the opening completely shut such that the food is totally encapsulated by the inside wall;

(c) conducting power to the heating element in order to heat the food within the confines of the pliable and flexible inside wall;

(d) terminating the power to the heating element after a predetermined amount of time;

(e) opening the completely shut opening of step (b); and (f) removing heated food off of the inside wall and through the opened opening.

It is therefore an object of the present invention to provide a pliable and flexible oven.

It is yet another object of the present invention to provide a method for heating foods and the like.

These, together with the various ancillary objects and features which become apparent to those skilled in the art as the following description proceeds, are attained by this novel oven and process, a preferred embodiment being shown with reference to the accompanying drawings, by way of example only, wherein:

BRIEF DESCRIPTION OF THE DRAWINGS

FIG. 7 is a segmented perspective view detailing the sequence of layering of a side of the pliable and flexible oven of FIG. 5;

FIG. 8 is a top plan view of the two insulation layers of the insulation means;

FIG. 9 is a side elevational view of the pair of insulation layers of FIG. 8;

DETAILED DESCRIPTION OF THE INVENTION

Figure 1:
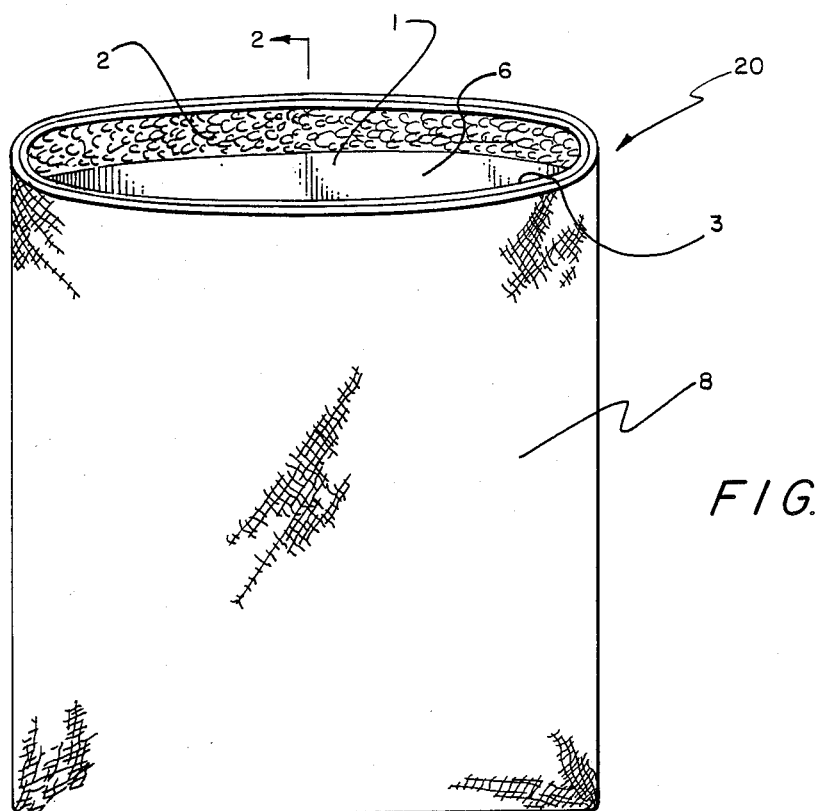
FIG. 1 is a front elevational view of the pliable and flexible oven in an open position.

Referring in detail now to the drawings wherein similar parts of the invention are identified by like reference numerals, there is seen a flexible and pliable oven, generally illustrated as 20, having a pliable and flexible inside wall 6 that is permeable to heat such that the same can be conducted therethrough. A means for fastening 2 is secured around the top edge of the inside wall 6 which is also the periphery of an opening 1. The inside wall 6 is formed such that the only opening is the opening 1 that is capable of being sealed shut when the means for fastening 2 is compressed together and against respective parts thereof. The bottom and the sides of the inside wall 6 are all integrally formed with respect to each other. The inside wall 6 is secured to a pliable and flexible outside wall 8 along a seam 7 and through a bridging member 3 that interconnects the top of the inside wall 6 with the top of the outside wall 8 and helps keep the inside wall 6 and outside wall 8 spaced apart which enables the air space therebetween to be better heated by a heating element 5 that is disposed between the inside wall 6 and outside wall 8. A conduit 4 extends through the outside wall 8 and connects to the heating element 5. Conduit 4 terminates in a plug 4A that is adaptable to be inserted into an outlet (e.g. 110 v. or 12 v. or any size voltage outlet depending on the capabilities of the heating element 5).

Figure 2:
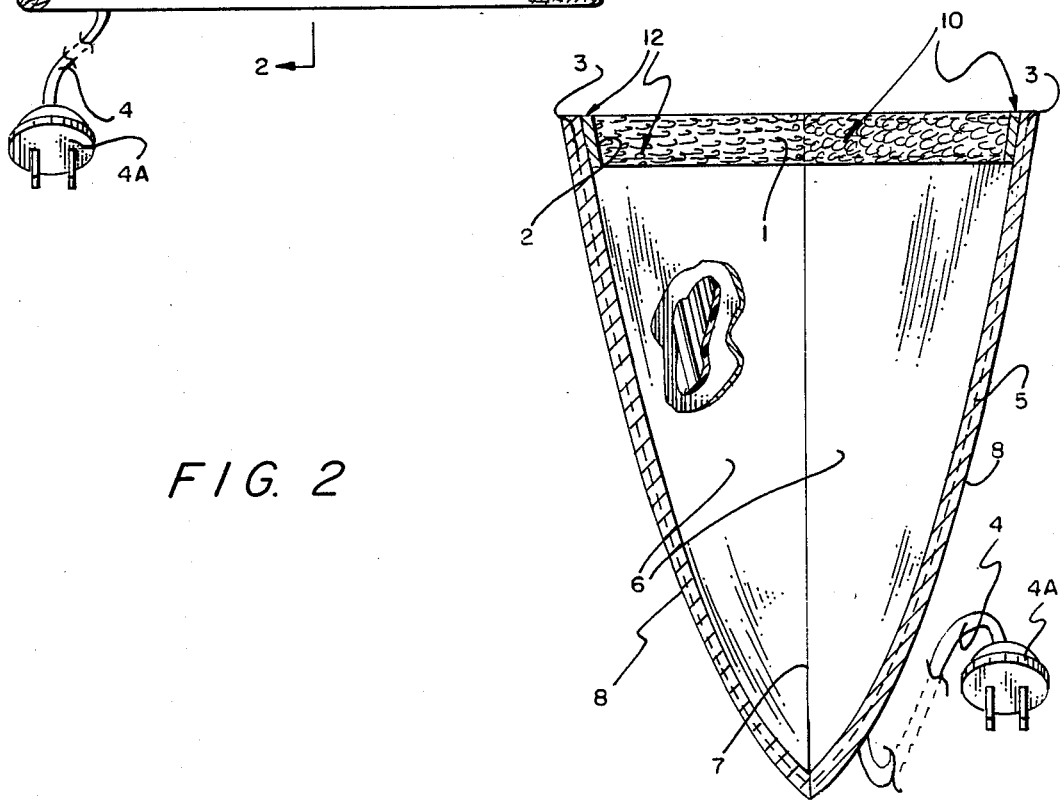
FIG. 2 is a vertical sectional view taken in direction of the arrows and along the plane of line 2—2 in FIG. 1.
Figure 3:
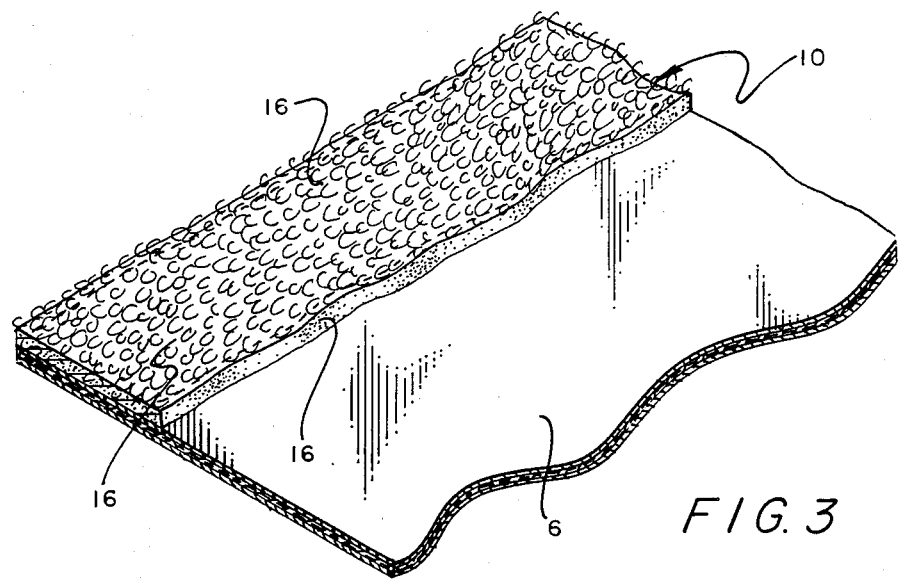
FIG. 3 is a perspective view of the hooking elements.
Figure 4:
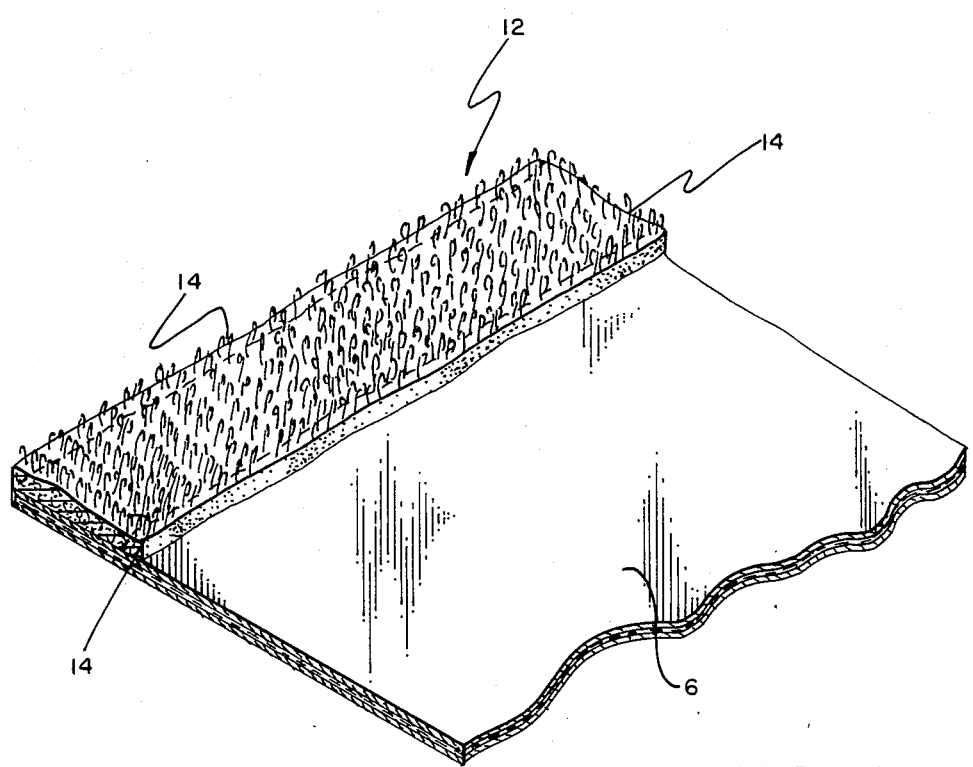
FIG. 4/is a perspective view of the plurality of the loops.
Figure 5:
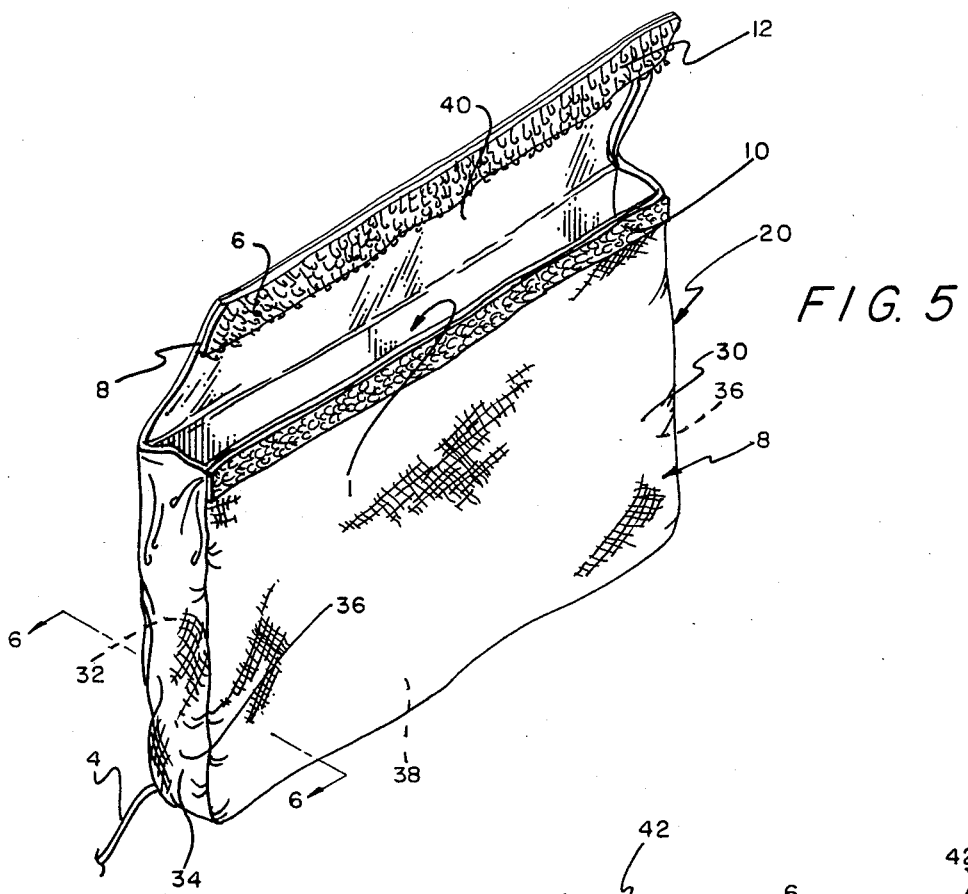
FIG. 5 is a perspective view of another embodiment of the pliable and flexible oven.
Figure 6:
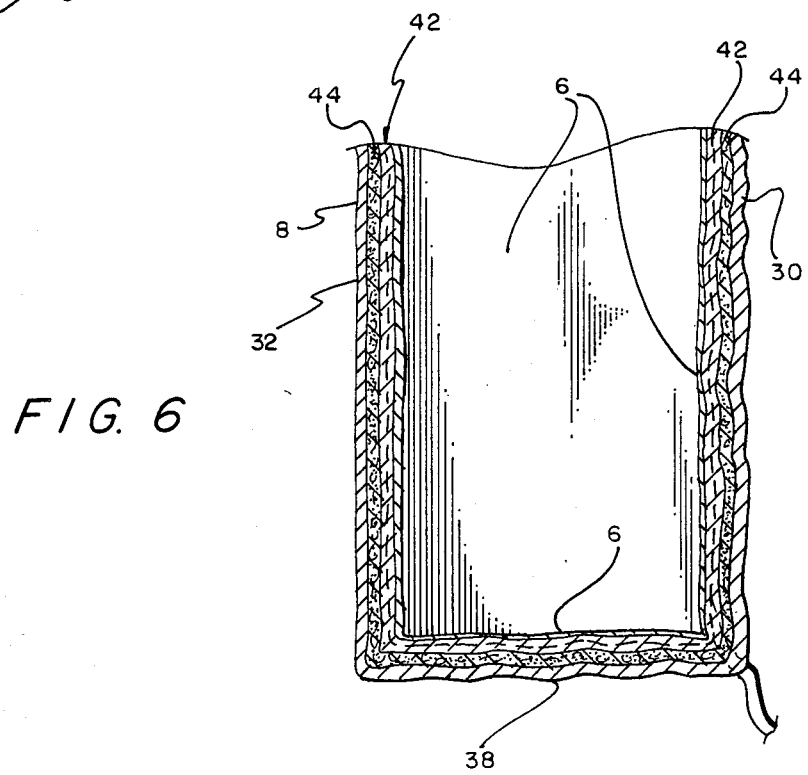
FIG. 6 is a vertical sectional view taken in direction of the arrows and along the plane of line 6-6 in FIG. 5.
Figures 10, 11:
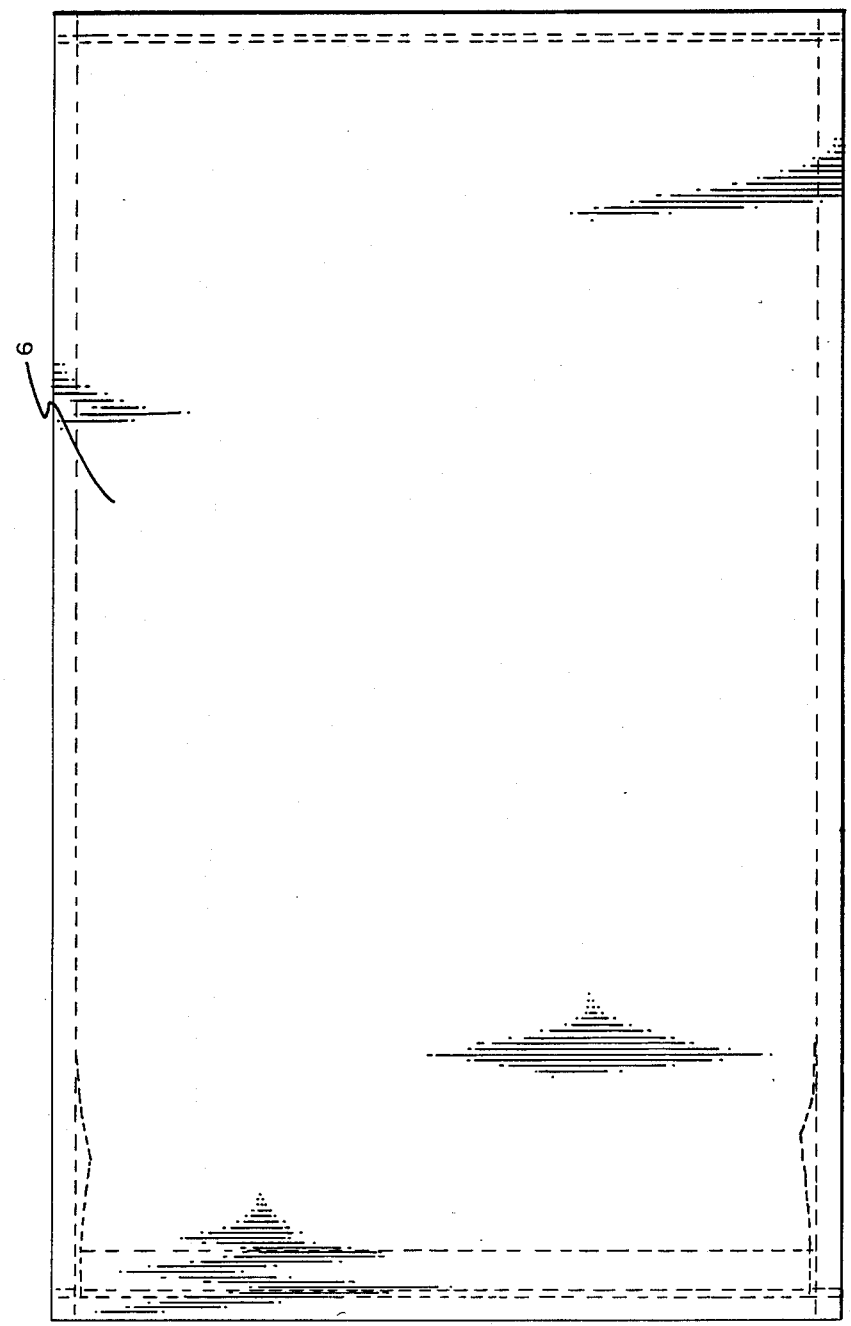
FIG. 10/ is a side elevational view of a side of the metallized inside wall reflective liner.
FIG. 11 is a top plan view of a metallized inside wall end piece that connects to the liner of FIG. 10 to constitute part of the inside wall of the pliable and flexible oven of FIG. 5.

In a preferred embodiment of the invention, the means for fastening 2 is a pressure sensitive type fastening means that seals when pressure is applied thereto and opens when pulled apart with force. Preferably, the means for fastening 2 comprises a gripping means 10 and a receiver means 12 of the type marketed under the registered trademark VELCRO® brand hook and loop fasteners by Velcro Corporation. In VELCRO® brand hook and loop fasteners, a surface defined by the hooks is merely placed into face-to-face relationship with a surface defined by the loops so that a large number of hooks engage a large number of loops and therefore are able to resist separation by forces parallel to the interfacial plane of engagement but are readily separable by peeling forces applied substantially normal to this interfacial plane. Therefore, the gripping means 10 comprises a plurality of mating hook-type hooking elements 16 upstanding from a surface thereof, respectively. Similarly, the receiver means 12 comprises a plurality of resilient loop-type elements 14. When the plurality of mating hook-type hooking elements 16 on one side of the opening 1 (see FIG. 2) is compressed under normal pressure against the plurality of resilient loop-type hooking elements 14 on the other side of the opening 1, the opening 1 is sealed shut, encapsulating food within the confines of the pliable oven 20. More specifically, food is totally enclosed within the confines of the flexible, pliable walls (i.e. inside wall 6 and outside wall 8) that sandwich or have disposed therebetween wire 5 that communicates to a power source through conduit 4. Power is released to the wire through the conduit 4 in order to heat food and the like that has been previously positioned therein. After the food has been heated sufficiently, power is released from the wire 5 (e.g. such as by unplugging the plug 4A from the cigarette lighter in a car or a wall outlet). The heated food is removed from within the pliable, flexible oven 20 after the gripping means 10 and receiver means 12 have been released from each other.

While the VELCRO® receiving and gripping means is the preferred gripping means 10 and the preferred receiver means 12, it should be understood that any type of receiver, gripping or fastener means is contemplated within the spirit and scope of this invention, especially the pressure sensitive sealing band. For example, any flexible engaging elements, including mushroomlike elements, resilient projections, etc., which are readily securable in face-to-face relation, and which particularly resist forces parallel to the interfacial plane of engagement, are contemplated within the spirit and scope of the present invention. Such mushroom configured hooking elements as the type disclosed in U.S. Patent Nos. 3,138,841 and 3,320,649, both to Naimer, and U.S. Pat. Nos. 3,718,725 and 3,770,359, both to Hamano are contemplated. Further examples of knitted form fastener members contemplated within the scope of the present invention are disclosed in U.S. Pat. Nos. 3,530,687 and 3,539,436, both to Hamano.

In the embodiment of the invention in FIGS. 5-15, there is seen oven 20 as having the inside wall 6 (which is preferably waterproof and reflective) and the outside wall 8, preferably comprising a fabric material. The inside wall 6 and the outside wall 8 are interconnected such as to form a front outer cover 30, a rear outer cover 32, and an intermediate cover strip 34 secured to the front outer cover 30 and to the rear outer cover 32 in order to form a pair of ends 36-36 and a bottom 38 and the opening 1. The rear outer cover 32 extends beyond the opening 1 to form a cover flap 40 that is adaptable to generally close the opening 1. The cover flap 40, as well as the intermediate cover strip 34 and the rear outer cover 32 and the front outer cover 30, comprises the inside wall 6 and the outside wall 8. Between the inside wall 6 and the outside wall 8 of the front outer cover 30 and the rear outer cover 32 and the bottom 38 are a heating grid, generally illustrated as 42, and an insulation means, generally illustrated as 44.

Figure 12:
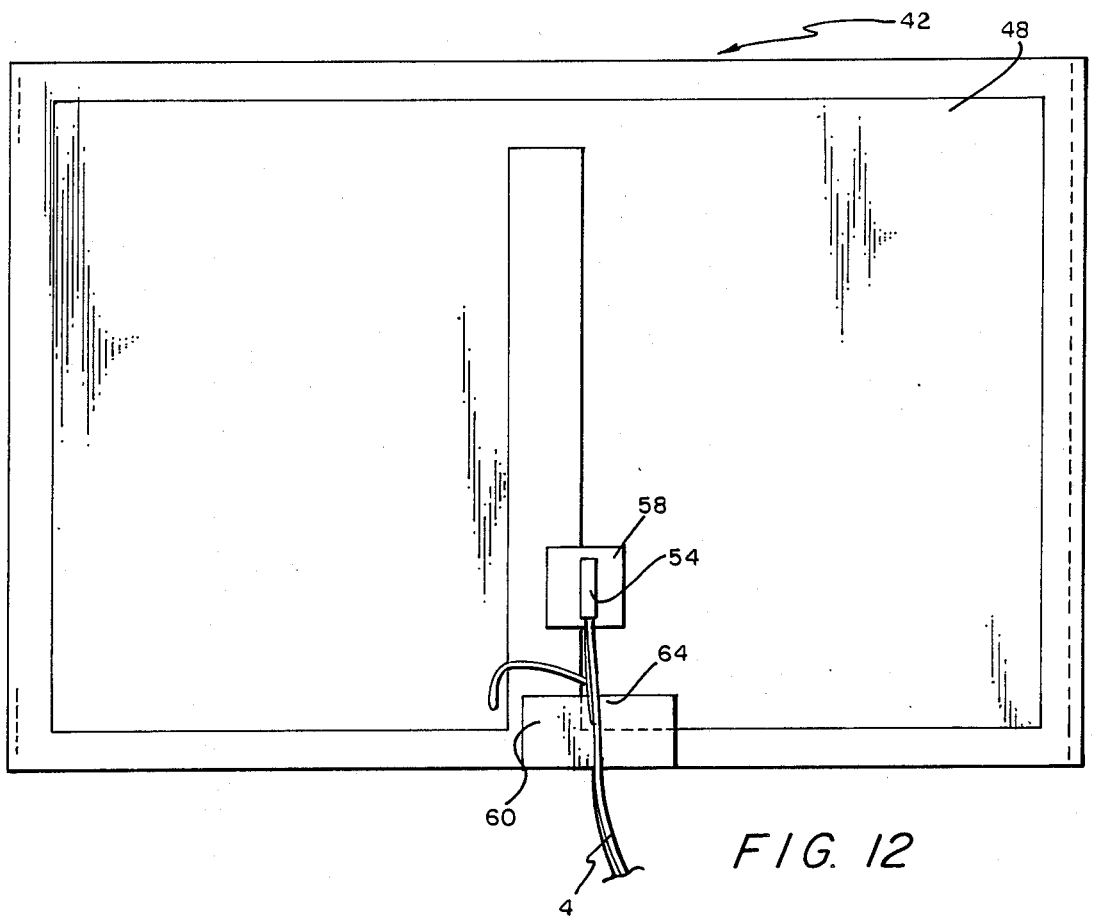
FIG. 12 is a top plan view of the heating element of the pliable and flexible oven of FIG. 5.
Figure 13:
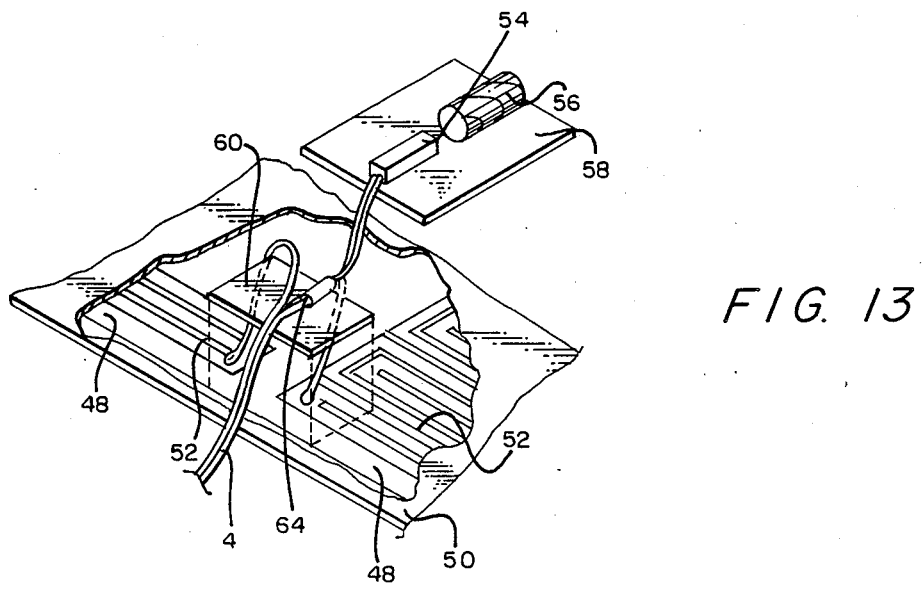
FIG. 13 is a perspective view of the heating element wiring for the heating element of FIG. 12.
Figure 14:
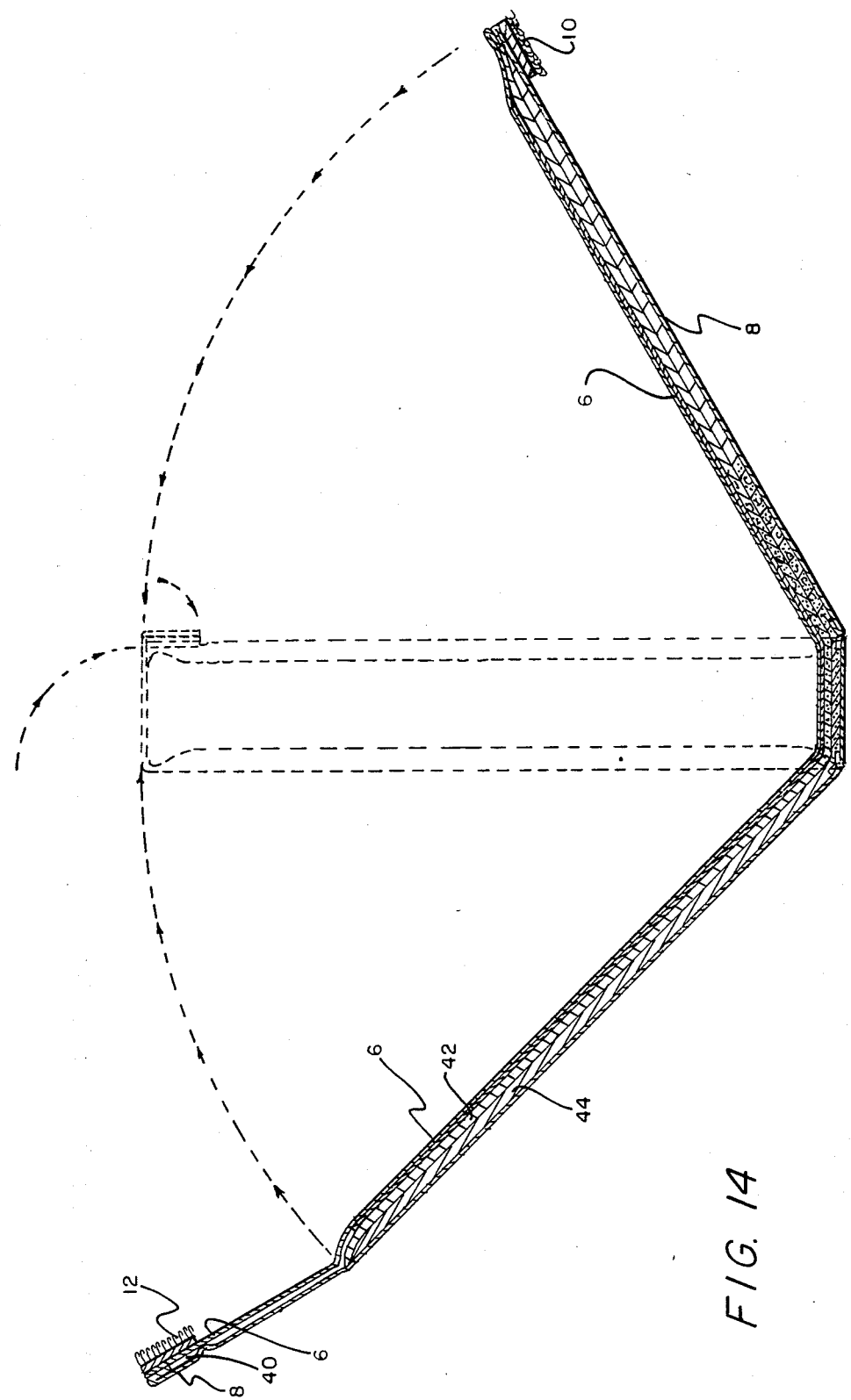
FIG. 14 is a segmented view of the pliable and flexible oven of FIG. 5 disclosing the outer fabric cover, and the two sheets of double layer insulation, the heating element, and the metallized inside wall, all before attaching the end pieces which are represented by dotted lines.
Figure 15:
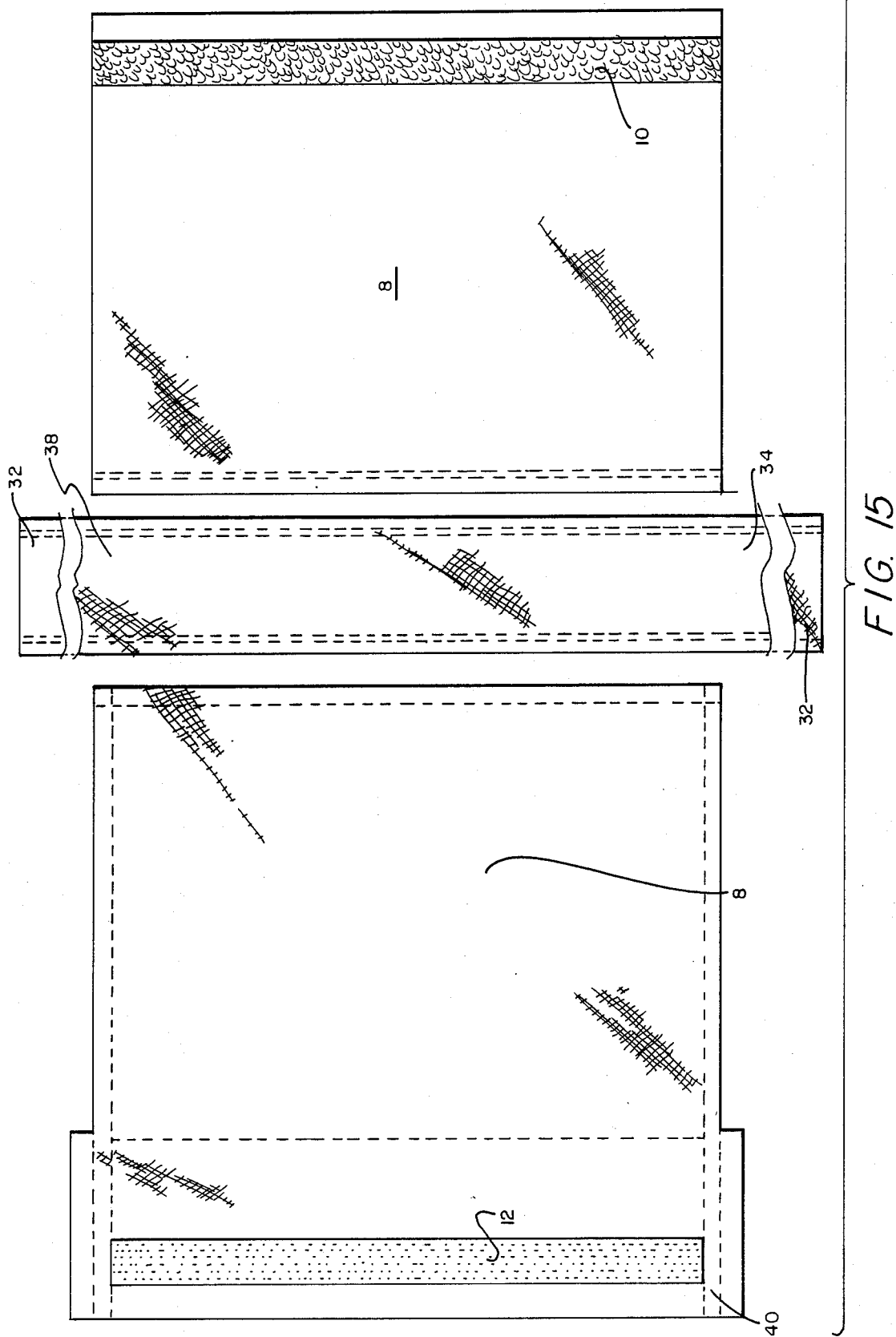
FIG. 15 is a top plan view of the front and back outer wall cover piece, and including a fabric strip disposed between the front and back outer cover piece which forms a continuous end/bottom/end of the completed outer fabric cover.

The heating grid 42, as best seen in FIG. 12 and FIG. 13, comprises an upper plastic sheet 48 and a lower plastic sheet 50 and a wire grid 52 disposed between the upper plastic sheet 48 and the lower plastic sheet 50 such as to substantially traverse the entire areal surface of each sheet 48 and 50. Preferably, the upper plastic sheet 48 and the lower plastic sheet 50 are compressed together such as to be essentially integrally interconnected together with the wire grid placed therebetween. The conductor 4 is engaged to the wire grid 52 and to a thermostat 54, as best illustrated in FIG. 13, which controls the temperature within the oven 20. The thermostat 54 is encased with a sleeve 56 slidably mounted thereto and therearound. The thermostat 54-sleeve 56 combination is mounted to and on a thermostat substate 58 which in turn is secured to the sheet 48. A strain relief (i.e., a vinyl or PVC substitute) sheet 60 is connected to sheet 48. The conductor 4 is secured to the sheet 60 by a mixture 64 of polyurethane and cabosil, preferably from about 1% by weight to about 99% by weight polyurethane.

Insulation means 44 may be any suitable insulation means but preferably comprises, as shown in FIG. 9, an inner foam insulation layer 44A and an outer foam insulation layer 44B.

The plastic sheets 48 and 50 may be any plastic sheets that are capable of accomplishing their desired purpose. Preferably, sheets 48 and 50 are polyester film sold under the trademark MYLAR®, registered to DuPont. The MYLAR® polyester film is a 300 to 1400 gauge polyester film comprising polyethylene terephthalate with the monomer having the general formula:

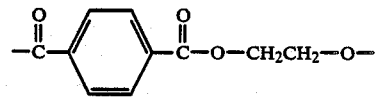

polyester film has a tensile strength of 20,000 psi to about 30,000 psi and can withstand temperatures of from $-70°$ C. to about $150°$ C. It contains no plasticizers, therefore it does not become brittle with age under normal conditions.

The waterproof, reflective inside wall 6 preferably comprises the MYLAR® polyester film, but also includes a coating which is preferably a copolymer of which vinylidene chloride is the predominant monomer. Vinylidene chloride copolymers are highly resistant to oxidation and biodegradation which makes themdurable at temperatures from about 0° C. up to about 120° C. Thus, the employment of the inside wall 6 comprising polyethylene terephthalate coated with vinylidene chloride copolymers, in combination with the other elements of the oven 20, all in order to heat food (or the like) resting or disposed on such an inside wall 6, is one of the salient features of this invention.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A pliable and flexible oven for heating food and the like comprising a pliable and flexible waterproof, reflective inside wall wherethrough heat can be conducted; a pliable and flexible outside wall secured to said inside wall, said inside and outside walls being secured to each other such as to form a front outer cover, a rear outer cover, and an intermediate cover strip secured to said front outer cover, to said rear outer cover in order to form a pair of ends and a bottom and an opening communicating with the inside wall, said rear outer cover extending beyond said opening to define a cover flap that is adaptable to generally close said opening; a fastening means secured to said cover flap and to said front outer cover for sealing the opening to totally enclose any food that has been disposed through the opening and resting on the waterproof, reflective inside wall; and a pliable and flexible heating element means for heating food resting on the inside wall, said heating element means disposed between the inside and outside wall and extending through the outside wall to communicate with a power source, said waterproof, reflective inside wall comprising polyethylene terephthalate.

2. The oven of claim 1 wherein said fastening means comprises a receiver means disposed along a periphery of an inside surface of said flap and a gripping means disposed along a perimeter of the front outer cover such as to be in a position to mate with the receiver means.

3. The oven of claim 2 wherein said receiver means comprises a plurality of flexible loop elements, and said gripping means comprises a plurality of exposed flexible hooking elements.

4. The pliable flexible oven of claim 2 wherein said inside wall further comprises a copolymer coating wherein vinylidene chloride is a predominant monomer.

5. The pliable flexible oven of claim 1 wherein said inside wall further comprises a copolymer coating wherein vinylidene chloride is a predominant monomer.

6. The oven of claim 1 wherein said heating element means comprises a heating grid means, a first heating sheet and a second heating sheet having disposed therebetween said heating grid means and wherein said first heating sheet and said second heating sheet are compressed together such as to be interconnected with said heating grid means postured therebetween; and a thermostat electrically engaged to said heating grid means.

7. The oven of claim 6 additionally comprising a sleeve means disposed around said thermostat and a strain relief substrate secured to said first heating sheet.

8. The oven of claim 7 additionally comprising a thermostat substrate means secured to said first heating sheet, said thermostat being secured to said thermostat substrate.

9. The oven of claim 8 wherein said first and said second heating sheet comprises polyethylene terephthalate.

10. The oven of claim 9 additionally comprising a conductor means electrically engaged to said heating grid means and to said thermostat and a mixture of polyurethane and cabosil for securing said conductor means to said strain relief substrate.

11. The pliable flexible oven of claim 6 wherein said inside wall further comprises a copolymer coating wherein vinylidene chloride is a predominant monomer.

12. The oven of claim 6 additionally comprising a pair of heat insulators disposed between said outside wall and said heating grid means.

13. The pliable flexible oven of claim 12 wherein said flexible wall further comprises a copolymer coating wherein vinylidene chloride is a predominant monomer.

14. A method for heating food and the like comprising the steps of:
   (a) disposing food through an opening and on a waterproof, reflective inside wall comprising polyethylene terephthalate and said inside wall is surrounded by a heating element extending through a pliable and flexible outside wall that is secured to the inside wall to totally enclose and sandwich the heating element between the inside wall and the outside wall;
   (b) sealing the opening completely shut such that the food is totally encapsulated by the inside wall;
   (c) conducting power to the heating element in order to heat the food within the confines of the pliable and flexible inside wall;
   (d) terminating the power to the heating element after a predetermined amount of time;
   (e) opening the completely shut opening of step (b); and
   (f) removing heated food off of the inside wall and through the opened opening.

15. The method of claim 14 comprising forming said inside wall to further comprise a copolymer coating wherein vinylidene chloride is a predominant monomer.

* * * * *